United States Patent
Arnold et al.

(10) Patent No.: US 10,348,888 B1
(45) Date of Patent: Jul. 9, 2019

(54) CALL MANAGEMENT SYSTEM FOR A COMMAND CENTER UTILIZING CALL METADATA

(71) Applicant: MOTOROLA SOLUTIONS, INC., Chicago, IL (US)

(72) Inventors: Scott Arnold, Etobicoke (CA); Julianne Folden, Chandler, AZ (US); Daniel Marcus, York (CA); Lisa Vailencour, Kirkland, WA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/054,806

(22) Filed: Aug. 3, 2018

(51) Int. Cl.
| | |
|---|---|
| *H04M 11/04* | (2006.01) |
| *H04M 3/00* | (2006.01) |
| *H04M 3/36* | (2006.01) |
| *H04M 3/42* | (2006.01) |
| *H04M 3/523* | (2006.01) |
| *H04M 3/436* | (2006.01) |

(52) U.S. Cl.
CPC ......... *H04M 3/36* (2013.01); *H04M 3/42042* (2013.01); *H04M 3/436* (2013.01); *H04M 3/523* (2013.01)

(58) Field of Classification Search
USPC .................................................. 379/37, 45
See application file for complete search history.

(56) References Cited

U.S. PATENT DOCUMENTS

| | | | |
|---|---|---|---|
| 4,517,561 A | 5/1985 | Burke et al. | |
| 5,946,386 A | 8/1999 | Rogers et al. | |
| 6,405,033 B1 | 6/2002 | Kennedy, III et al. | |
| 7,880,607 B2 | 2/2011 | Olson et al. | |
| 9,258,419 B2 | 2/2016 | Bradburn | |
| 2013/0083902 A1* | 4/2013 | Goswami | H04W 4/029 379/37 |
| 2014/0286484 A1* | 9/2014 | Ehrlich | H04W 4/90 379/142.06 |
| 2017/0064078 A1* | 3/2017 | Dahan | H04W 4/90 |

FOREIGN PATENT DOCUMENTS

WO  2003033092  4/2003

* cited by examiner

*Primary Examiner* — Quoc D Tran
(74) *Attorney, Agent, or Firm* — Michael Best & Friedrich LLP

(57) ABSTRACT

Methods and systems for optimizing a call queue at a dispatch center. One system includes an electronic computing device including an electronic processor configured to define an incident based on a first call received from a first communication device, wherein the incident includes an incident location, receive, from a second communication device operated by a caller, a second call, perform an analysis of a metadata of the second call, determine a caller identification based on the metadata of the second call when the electronic processor determines, based on the analysis, that either (1) a call traffic level, following the first call, exceeds a call traffic threshold, or (2) a location of the second communication device is proximate to a location of the incident, and direct the second call to either a primary call handling workstation or a secondary call handling workstation based on the caller identification.

20 Claims, 4 Drawing Sheets

US 10,348,888 B1

CALL MANAGEMENT SYSTEM FOR A COMMAND CENTER UTILIZING CALL METADATA

BACKGROUND OF THE INVENTION

Law enforcement and other public safety personnel respond to incidents in the course of their duties. Responding to incidents often involves collecting myriad pieces of information (for example, police reports, evidence, witness reports, video and other media assets, and the like) related to the incident response from numerous callers. During the occurrence of one or more incidents, the number of calls received at a dispatch command center may increase. Emergency call takers and incident-handling dispatchers may not be able to handle the calls efficiently by themselves.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
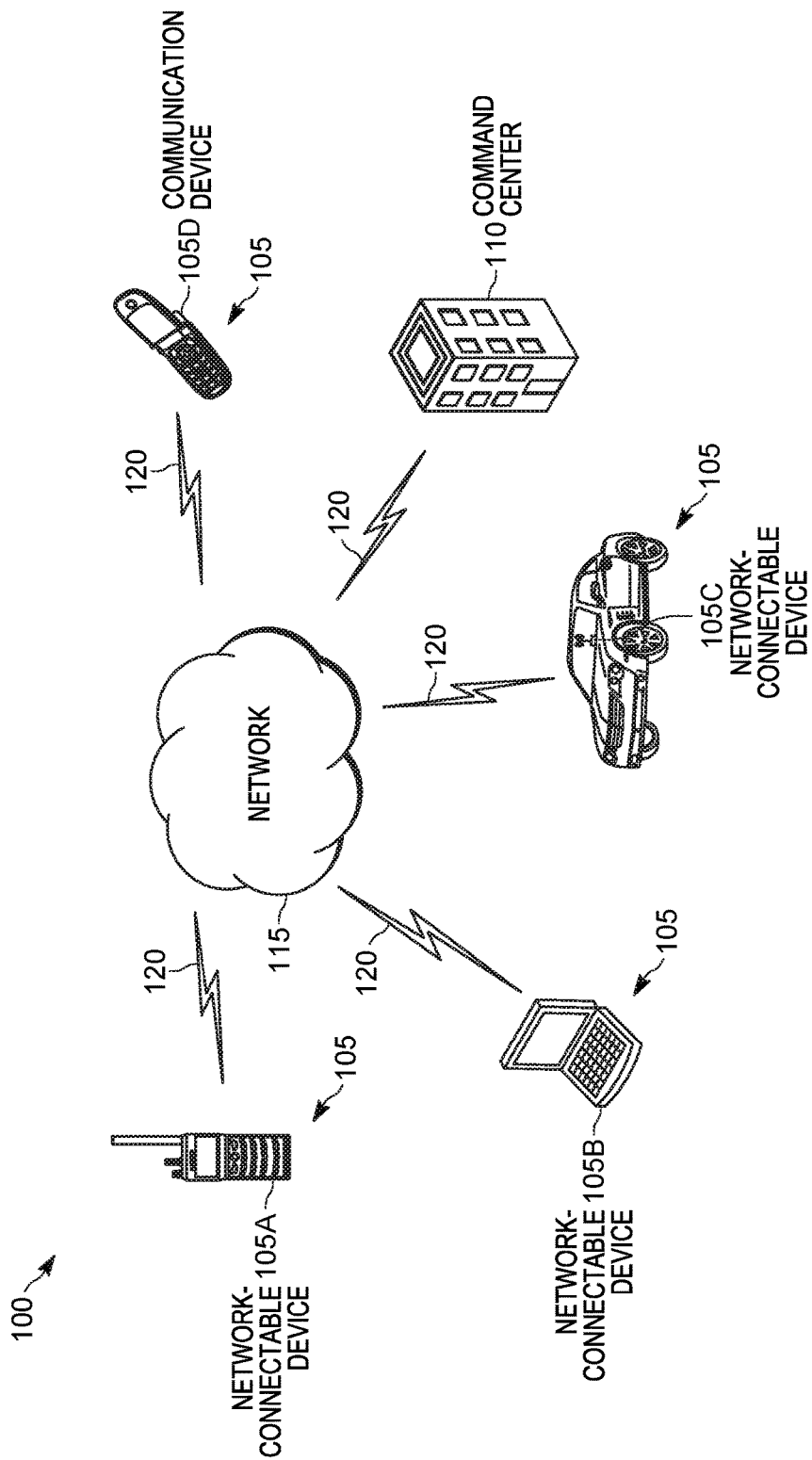
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, landline, or satellite), devices with an interactive display, and other communication devices may be a part of a console (sometimes referred to herein as a workstation) operated by an emergency call taker or public safety dispatcher (herein sometimes referred to as call handlers) in a call or command center. In some embodiments, the console of a call handler presents one or more received data feeds to the call handler via an output device. For example, content of a voice call is presented audibly via a speaker of the console. In other words, the console allows the call handler to participate in voice calls with callers, for example, a citizen or a public safety officer.

The number of calls received at a command center (a call volume) may increase when there is a major or significant incident (for example, a fire, a car accident, a robbery, and the like) due to many people calling for the same reason. Due to the high call volume, call handlers at the command center may be unable to handle all the calls received and have to place remaining pending calls in a call queue to be handled later. This increases the call answer times for callers attempting to reach a call handler at the command center. This creates an issue for callers that need immediate help but are stuck waiting until a call handler is available. Longer call answer times may also cause some callers to hang-up and call back repeatedly. This further increases the call volume as command centers may be required to respond to abandoned calls in order to verify that the caller is not in need of assistance.

In many instances, call handlers have no way of knowing the reason for active (ringing) calls or abandoned calls. Call handlers also have no way of knowing which calls (both active and abandoned) are (or were) urgent and which are (or were) not. Thus, there is a technological problem with respect to the communication between a command center and people reporting incident information to the call handler. Accordingly, there is need for a system that reduces both call answer waiting times and the number of abandoned calls by discerning which calls need to be handled immediately.

Disclosed are, among other things, a method, device, and system for one or more electronic processors to handle calls between a communication device of a call handler (for example, a console) and a plurality of communication devices of callers (for example, smart telephones, tablets, portable radios, and the like). In one example, the system is configured to direct a call from a communication device (for example, a mobile phone) operated by a caller that may be in regard to an active or recent incident to either a primary call handling workstation (operated by a primary call handler) or a secondary call handling workstation (operated by a secondary call handler) based on (1) a current call traffic level at the command center exceeding a call traffic threshold, or (2) a proximity of a location of the current call to a location of the incident. The system directs the calls based on a caller identification (for example, a role of the caller). In one instance, when the caller is a public safety officer handling the incident, the call is directed to the primary call handling workstation.

The system may also be configured to determine a risk level of the caller based on information, for example, from one or more sensors in communication with the command center. Such information may include an incident identity, a relative location of the communication device with respect to a scene of the incident, a direction of travel of the communication device, and a speed of travel of the communication device. When the system determines that the risk level of the caller exceeds a predetermined risk threshold, the call is directed to the primary call handling workstation/ handler. Otherwise the call is directed to the secondary call handling workstation/handler. This allows calls of higher priority to be handled by a primary call handler tasked with handling the particular incident while remaining calls, which may not be as critical, are directed to a secondary call handler. In some embodiments, the system limits the number of calls handled by the primary call handler (for example, below a particular call traffic threshold) compared to the number of calls handled by the secondary call handler because, for example, the calls being handled by the primary call handler are likely to be more important and/or more urgent than the calls being handled by the second call handler. In some situations, the system limits the number of calls handled by the primary call handler compared to the number of calls handled by the secondary call handler when the number of primary call handlers is less than the number of secondary call handlers. Additionally, handling too many calls (for example, the likely most important and/or urgent calls associated with the incident) may be stressful to a primary call handler and reduce their efficiency in handling calls. The proposed method of call management may be useful when the primary call handler assigned to the incident feels that they have received, from one or more previous calls, enough information about the incident and that any further calls may provide only redundant or supplemental information and are not necessary to handle by a primary call handler. The primary call handler may activate the call handling system so that they receive only critical calls while the rest are directed to another call handler such as a secondary call handler. In some embodiments, non-critical calls may be directed to an automated call handler (for example, embodied by a secondary call handling workstation) when the risk level associated with the call fails to exceed a second predetermined risk level. This reduces the number of calls handled by a call handler resulting in reduced call answering time and reduced call volume.

Examples disclosed herein are described in terms of public safety and emergency personnel. However, it should be understood that the systems, methods, and devices described herein are not limited to the public safety environment and may be applied to other types of communication centers, for example, a customer service center.

As noted, in some embodiments, the console is operated by a call handler. In some situations, a public safety command center includes one or more consoles each operated by a different call handler. In some situations, the call handlers include emergency call-takers and incident-handling dispatchers (collectively referred to herein as call handlers). In some embodiments, an emergency call-taker is a person who analyzes one or more received data feeds via a console as described in more detail below. The one or more data feeds may include, for example, a voice call, live or recorded video feed, text message, and the like. The emergency call-taker identifies an incident based on one or more data feeds, and decides how to respond to help the caller and handle the incident. For example, the emergency call-taker may transfer a data feed to a different agency (for example, animal control), take no action (for example, when the data feed is a prank call or an accidental call), transfer the data feed to the console of an incident-handling dispatcher, and the like.

A console of an incident-handling dispatcher receives one or more data feeds from citizens and others in response to an emergency call-taker using a console to transfer the one or more data feeds to the console of the incident-handling dispatcher. In some situations, the incident-handling dispatcher is temporarily assigned to an incident in which officers are supervising, maintaining, providing assistance, and the like (for example, a concert, a sporting event, management of a theme park or other entertainment venue, and the like). In some embodiments, the incident is an event, occurrence, or situation in which officers are involved. For example, the incident is a public safety incident in which public safety officers are called to a location to provide assistance in resolving or preventing a societal or environmental problem (for example, a location where a suspect is committing or has committed a crime, a fire, a vehicular accident, a traffic stop, and the like).

As an example of the console receiving data feeds from devices of officers, the console of the incident-handling dispatcher receives an audio feed (for example, a voice call) from a portable radio. As another example, the console receives a video feed or an image feed from one or more of a camera of a communication device such as a smart telephone, a dash camera of a vehicle, and a body-worn camera of an officer. As other examples, the console of the incident-handling dispatcher receives a data feed from a biometric sensor that monitors biometric data or a data feed from an alarm system that monitors a building (for example, a fire alarm, a toxic gas alarm, and the like). In some embodiments, the console receives a data feed from a device that is not operated by a citizen or an officer such as one or more of a security camera, a traffic camera, and the like.

One embodiment provides a system for call queue improvement. The system includes an electronic computing device including an electronic processor configured to define an incident based on a first call received from a first communication device, where the incident includes an incident location. The electronic processor is also configured to receive, from a second communication device operated by a caller, a second call, and perform an analysis of a metadata of the second call. The electronic processor is also configured to determine a caller identification based on the metadata of the second call when the electronic processor determines, based on the analysis, that either (1) a call traffic level, following the first call, exceeds a call traffic threshold, or (2) a location of the second communication device is proximate to a location of the incident. The electronic processor is also configured to direct the second call to either a primary call handling workstation or a secondary call handling workstation based on the caller identification.

Another embodiment provides a method for managing calls at a command center. The method includes defining, with an electronic processor, an incident based on a first call received from a first communication device. The incident includes an incident location. The method further includes receiving, from a second communication device operated by a caller, a second call. The method further includes performing, with the electronic processor, an analysis of a metadata of the second call. The method further includes determining, with the electronic processor and based on the analysis of the metadata, that either (1) a call traffic level, following the first call, exceeds a call traffic threshold, or (2) a location of the second communication device is proximate to the incident location. The method further includes determining, with the electronic processor, a caller identification based on the metadata of the second call in response to determining that either (1) the call traffic level, following the first call, exceeds the call traffic threshold, or (2) the location of the second communication device is proximate to the incident location. The method further includes directing, with the electronic processor, the second call to either a primary call handling workstation or a secondary call handling workstation based on the caller identification.

FIG. 1 is a block diagram of a communication system 100 according to one example embodiment. The communication system 100 includes various communication devices 105A through 105D communicatively coupled to a command center 110 via a network 115. In the following description, when explaining how a single communication device functions, a reference to communication device 105 is used. The communication device 105 may be any one of a number of different types of communication devices. For example, the communication device 105 may be one or more of a smart telephone, a portable radio, a desktop or laptop computer, a tablet, a body wearable camera, a biometric sensor, or similar device. The communication device 105 may be configured to receive input from a user, for example, via a keyboard, a touchscreen display, a microphone (for example, voice commands), and the like. Each communication device 105 may be operated by a civilian or a public safety officer.

In some embodiments, one or more communication devices 105 are not operated by a citizen or an officer. Instead, the communication devices 105 may include a security camera, a traffic camera, and the like. In some embodiments, the communication system 100 includes more or fewer communication devices 105 than the number of communication devices 105 shown in FIG. 1.

In the example illustrated in FIG. 1, the communication system 100 includes a command center 110. For example, the command center 110 is a private or enterprise security-management office at a theme park or a public safety command center such as a police headquarters, fire station, dispatch center, public safety answering point (PSAP), operations center, command and control facility, and the like. The command center 110 includes a monitoring computer 205 and one or more workstations 210 that are part of the communication system 100 as explained below with respect to FIG. 2.

The communication devices 105A through 105D and the command center 110 may communicate with each other over a network 115 over respective wireless links 120 and via corresponding network interfaces including, for example, one or more transceiver circuits (for example, by sending and receiving radio signals). The network 115 may include wireless and wired portions. And one, some, or all of the wireless links 120, such as the wireless link between command center 110 and network 115, may be substituted with a wired network link. All or parts of the network 115 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may also include a combination of the networks mentioned.

Figure 2:
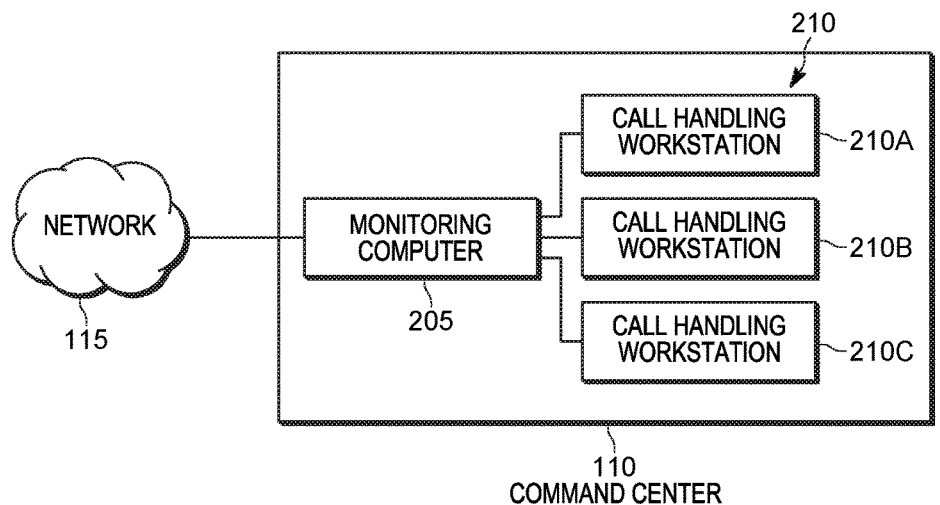
FIG. 2 is a block diagram of a command center included in the communication system of FIG. 1 according to one example embodiment.

FIG. 2 is a block diagram of the command center 110 according to one example embodiment. The command center 110 includes a monitoring computer 205 and a plurality of workstations 210A through 210C. In the following description, when explaining how a single workstation functions, a reference to workstation 210 is used. The workstations 210 are consoles that are each operated by a separate call handler. In some embodiments, the monitoring computer 205 is communicatively coupled to the network 115 and to the workstations 210A through 210C via wired connections, wireless connections, or a combination thereof. In some embodiments, the command center 110 includes more or fewer workstations 210 than the number of workstations 210 shown in FIG. 2.

As explained in greater detail below, the monitoring computer 205 is configured to receive one or more data feeds from one or more communication devices 105 over the network 115. In some embodiments, the monitoring computer 205 is configured to control which received data feeds are provided to which workstations 210. Likewise, the workstations 210 are configured to communicate through the monitoring computer 205 to one or more communication devices 105 over the network 115. For ease of description, data feeds received at monitoring computer 205 that are then directed to the one or more workstations 210 are herein referred to as "calls." It should be understood that, while the calls are described as being audio feeds (voice calls) in the examples described herein, calls may be or include other types of data feeds as described above, including but not limited to audio/video calls.

The monitoring computer 205, described more particularly below with respect to FIG. 3, may be implemented as a stand-alone device (for example, a server) or distributed across one or more electronic processing devices (for example the workstations 210A-210C). In some embodiments, the monitoring computer 205 may be implemented as a cloud-based server/application (for example, operating on one or more servers).

The workstation 210 is used by a call handler (for example, a console used by an incident-handling dispatcher as explained above). The workstation 210 is configured to send and receive data to and from the monitoring computer 205 (via the communications network 115). As indicated by FIG. 1, the workstation 210 may be configured to communicate with one or more communication devices 105. The workstation 210 may receive captured images, video, audio, and other data related to incidents or some combination of the foregoing. The workstation 210 is configured to transmit and/or receive data through the monitoring computer 205 or directly over the communication network 115. Although the workstations 210 are described as being located at the command center 110, in some embodiments, one or more of the workstations 210 are portable devices such as the communication devices 105 described above.

As explained in greater detail below, one or more call handlers each operating a workstation 210 may be assigned as a primary call handler for a particular existing incident. One or more call handlers operating a workstation 210 that are not assigned to a particular existing incident and/or are assigned to be secondary handlers of calls regarding the existing incident may be assigned as a secondary call handler. For ease of description, a workstation 210 being operated by a primary call handler is referred to herein as a primary call handling workstation 210A. Similarly, a workstation 210 being operated by a secondary call handler is referred to herein as a secondary call handling workstation 210B. It should be understood that while reference to a single primary or secondary call handling workstation 210A and 210B is made, in some embodiments, there is more than one primary call handling workstation 210A and, in some embodiments, more than one secondary call handling workstation 210B.

As mentioned above, the monitoring computer 205 receives and allocates calls received from one or more communication devices 105 to one or more of the workstations 210. In certain embodiments, a call record is created for each call received at the monitoring computer 205. Each call record includes information regarding the call, for example, a telephone number associated with the communication device 105 that transmitted the call, a timestamp of when the call was first received, a caller identification, a location that the call is from (for example, as determined by the communication device 105 itself such as by a global positioning system (GPS) device and reported to the monitoring computer 205 or as determined by the network such as by a triangulation process or pre-stored fixed street address associated with the communication device 105), a location of a cell tower that was used to transmit the call, and the like. Information included in the call record may be obtained by analyzing the one or more data feeds and/or extracting metadata included in the call. The analysis may be performed while the call is in a queue and/or when the call is being handled by a call handler. Metadata included in a call may include a location of the communication device 105 that transmitted the call at the time the call was transmitted or initiated, a timestamp including a time at which the call was transmitted, an identifier that identifies a user of the communication device 105 that transmitted the call, and the like. When the call is or includes a text feed (for example, a text message) or a biometric sensor data feed, the monitoring computer 205 analyzes the data feed.

The call record is associated with an incident record. The incident record includes information and details regarding a new incident or an incident handled or that is being handled by officers, other first responders, and the like (for example, an incident type, a location of the incident, a timeline of the incident, etc.). The incident and call records are stored in one or more databases communicatively coupled to and/or within the command center 110 (for example, in the second memory 410 of the monitoring computer 205 described below in regard to FIG. 4). The monitoring computer 205 also maintains a queue of calls received from communication devices 105 that are intended for the command center 110. As described in more detail below, the monitoring computer 205 routes a call in the queue to either a primary call handling workstation 210A, a secondary call handling workstation 210B, or an automated call handler. In some embodiments, each of the primary call handling workstation 210A and the secondary call handling station 210B are operated by a respective call handler. In other embodiments, the secondary call handling station 210B is an automated call handler that is not operated by a call handler. When the primary call handler and/or secondary call handler (for example, emergency call-takers and incident-handling dispatchers) are currently handling other calls (for example, voice calls), other calls directed from the monitoring computer 205 to the corresponding workstation 210 may be placed in a queue of the workstation 210. In embodiments where the monitoring computer 205 is distributed across the workstations 210, the workstations 210 may be notified of an incoming call and logic operating in parallel across the instances of the distributed monitoring computer 205 may determine which workstation 210 should receive the incoming call for handling by a call handler. In some embodiments where the monitoring computer 205 is distributed across the workstations 210, a sideband connection exists between workstations 210 through which the workstations 210 that embody the distributed monitoring computer 205 negotiate with each other to determine which workstation 210 receives the incoming call.

In some embodiments, more than one call handler may be assigned to the same incident. For example, as explained above, there may be more than one primary call handling workstation 210A. In such embodiments, calls directed to a particular group of call handling workstations 210 (primary or secondary) may each be received by different workstations 210 of that group. When the call handlers of a particular call handling group are all currently handling calls, further calls directed to the particular group may be placed in a group queue, wherein the first available call handler of the group receives the first (oldest of the other calls in the queue) call in the queue.

As explained below, the monitoring computer 205 may direct the call to the queue of an automated call handler. The automated call handler (or an automatic call handling system) is configured to respond to the call to help the caller and handle the incident in an automated manner (for example, using one or more of voice analytics, video analytics, text analytics, and the like to take a predetermined action based on the received data feed). The automated call handler provides an automated questionnaire to a caller in order to determine how to handle the call (for example, what information to provide to the caller, a device or a queue to which a call should be transferred, and the like). In some embodiments, the monitoring computer 205, one or more of the workstations 210, or a combination of both is configured to perform some or all the processes of the automated call handler. In further embodiments, the automated call handler is provided (in part or completely) by one or more components of a system outside the command center 110. The automated call handler receives information about the call from the communication device 105 of the caller via a data feed (for example, a voice call). In response to the automated questionnaire, the automated call handler (specifically, the monitoring computer 205) receives information about the data feed from a user of the communication device 105 providing the data feed. In some embodiments, the monitoring computer 205 determines additional information from the received information from the user of the communication device 105 as explained in greater detail below (for example, incident type information based on keyword data). The automated call handler may also analyze metadata of a call from a user of a communication device 105 while handling a call. The automated call handler may add such information to the call record associated with the call. A call handler of a workstation 210 may add additional information to the call record via user input through the workstation 210. The monitoring computer 205 may direct the call to another workstation 210 (for example, to the primary call handling workstation 210A or the secondary call handling workstation 210B) based on the received information from the user of the communication device 105.

Figure 3:
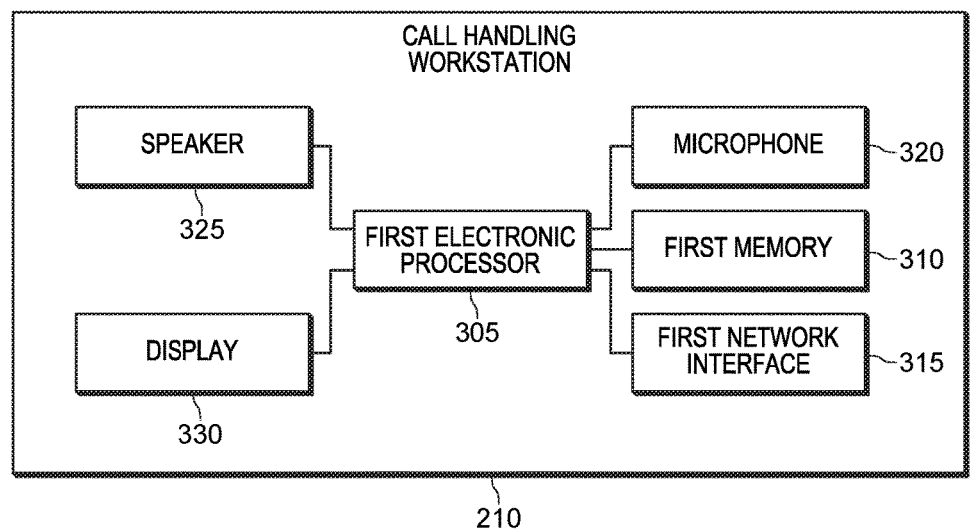
FIG. 3 is a block diagram of a workstation included in the command center of FIG. 2 according to one example embodiment.

FIG. 3 is a block diagram of a workstation 210 according to one example embodiment. In the embodiment illustrated, the workstation 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the workstation 210 includes fewer or additional components in configurations different from that illustrated in FIG. 3. For example, the workstation 210 may additionally include a push-to-talk button or a camera. As another example, the workstation 210 may include one or more additional input devices such as a computer mouse and/or a keyboard that receive inputs from a user of the workstation 210. In some embodiments, the workstation 210 performs functionality other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein. In some embodiments, the first memory 310 is implemented on devices located at the command center 110, at a remote location, or at a remote cloud-computing cluster. The memory 310 may include one or more databases relative to the command center 110. Such databases store information and records relative to the command center 110 including public safety officer/employee contact information, talkgroup lists, incident records, call records, and additional public safety resources.

The first network interface 315 sends and receives data to and from the monitoring computer 205. In some embodiments, the first network interface 315 additionally or alternatively sends and receives data to and from the network 115 without the data first passing through a separate monitoring computer 205. In some embodiments, the first network interface 315 includes one or more transceivers for wirelessly communicating with the monitoring computer 205 and/or the network 115. Alternatively or in addition, the first network interface 315 may include a connector or port for receiving a wired connection to the monitoring computer 205 and/or the network 115, such as an Ethernet cable.

The first electronic processor 305 may receive one or more data feeds (for example, a video feed, an audio feed, an audio/video feed, an image feed, a text feed, a sensor input data feed, and the like) over the network 115 through the first network interface 315 (for example, data feeds generated by one or more communication devices 105 and transmitted over the network 115). In some embodiments, the first electronic processor 305 receives data through the first network interface 315 directly from a communication device 105. In some embodiments, communication of data feeds may occur in approximately real-time. The first electronic processor 305 may communicate data generated by the workstation 210 over the network 115 through the first network interface 315, such as for receipt by one or more communication devices 105. For example, the first electronic processor 305 receives electrical signals representing sound from the microphone 320 and may communicate information relating to the electrical signals over the network 115 through the first network interface 315 to other devices, for example, to one or more communication devices 105. Similarly, the first electronic processor 305 may output the one or more data feeds received from the network 115 through the first network interface 315, for example from a communication device 105, through the speaker 325, the display 330, or a combination thereof. For example, the workstation 210 engages in a voice call with a communication device 105 over the network 115.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the workstation 210 (for example, an incident-handling dispatcher). In some embodiments, the microphone 320, a computer mouse, and/or a keyboard or a touch-sensitive display are referred to as input devices that receive input from a user of the workstation 210.

In some embodiments, the communication devices 105 include same or similar components as those shown in FIG. 3 with respect to the workstation 210. In some embodiments, the communication devices 105 include fewer or additional components in configurations different from that illustrated in FIG. 3. For example, a communication device 105 may also include one or more of a push-to-talk button to initiate voice communication over the network 115 (for example, an audio feed), a camera to capture a video feed and/or an image feed to be transmitted over the network 115, and a location component (for example, a global positioning system receiver) configured to determine the geographic coordinates of the location of the communication device 105. In some embodiments, the communication devices 105 transmit their respective location coordinates over the network 115 when transmitting data feeds to the command center 110 (for example, location information is stored as metadata associated with a data feed). Similarly, in some embodiments, the communication devices 105 also include a time stamp when transmitting a data feed such that the command center 110 may determine a time of capture of the data feed or a time of transmission of the data feed. In some embodiments, each communication device 105 has a unique identifier and transmits the unique identifier over the network 115 when transmitting data feeds to the command center 110 (for example, a unique identifier is stored as metadata associated with a data feed). In some embodiments, the communication devices 105 transmit a text feed over the network 115 to the command center 110 (for example, a text message).

In some embodiments, one or more of the communication devices 105 may also include one or more sensors. The sensor generates data related to, for example, a user of the respective communication device 105 and/or an environment of the communication device 105. For example, the communication device 105 may include a biometric sensor to monitor biometric data (for example, heart rate, breathing rate, body temperature, and the like). As another example, the communication device 105 may include a pedometer, a sensor-enabled holster to detect when a weapon has been removed from the holster, and/or a sensor that detects when the weapon has been discharged. As yet another example, the communication device 105 may include one or more sensors that monitor an environment of the user such as temperature, humidity, air quality, ambient noise level, and the like. In some embodiments, one or more sensors are separate from a communication device 105, and the separate sensors are not capable of directly communicating over the network 115. In such embodiments, the separate sensors (for example, a sensor-enabled holster) may communicate over the network 115 via a communication device 105 (for example, a nearby smart phone, portable radio, and the like). For example, such separate sensors form a personal area network (PAN) with the communication device 105 via corresponding short-range PAN transceivers, which may be based on a Bluetooth, Zigbee, Bluetooth Low Energy, WiFi, Near Field Communication (NFC), Radio Frequency ID (RFID) or other short-range wireless protocol. In such embodiments, the combination of the communication device 105 and associated separate sensors that communicate monitored data to the communication device 105 may be referred to as a single communication device 105. In some embodiments, the communication devices 105 transmit one or more sensor input data feeds over the network 115 to the command center 110, for example, to be displayed on a workstation 210 of an incident-handling dispatcher. In some embodiments, the communication devices 105 perform functionality other than the functionality described above.

Figure 4:
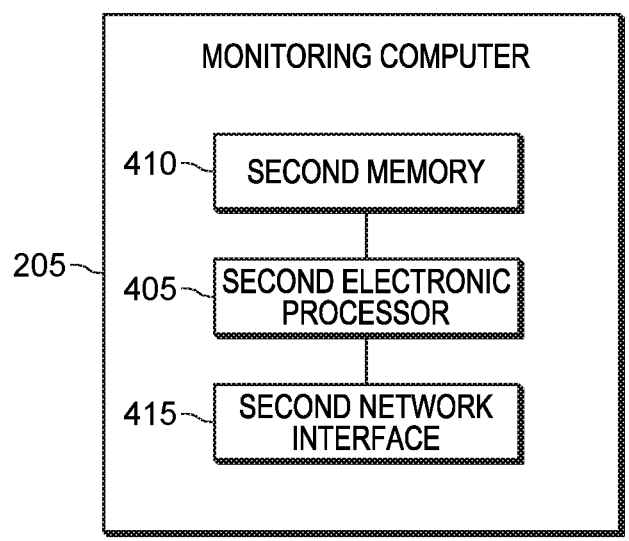
FIG. 4 is a block diagram of a monitoring computer included in the command center of FIG. 2 according to one example embodiment.

FIG. 4 is a block diagram of the monitoring computer 205 according to some embodiments. In the example shown, the monitoring computer 205 includes a second electronic processor 405 electrically connected to a second memory 410 and a second network interface 415. These components are similar to the like-named components of the workstation 210 explained above with respect to FIG. 3 and function in a same or similar manner as described above. In some embodiments, the second network interface 415 sends and receives data to and from the network 115 and the workstations 210. In some embodiments, the monitoring computer 205 includes fewer or additional components in configurations different from that illustrated in FIG. 4. For example, the monitoring computer 205 may additionally include a display such as a touch screen to allow a user to reprogram settings of the methods described below. In some embodiments, the monitoring computer 205 performs functionality other than the functionality described below.

The monitoring computer 205 is configured to receive calls from communication devices 105 operated by citizens (for example, smart phones of citizens who have entered a user input to transmit one or more calls to a public safety command center 110 by, for example, dialing 9-1-1) and allocate or transmit the call(s) to one or more of the workstations 210 to be handled. In other words, the monitoring computer 205 is configured to act as a switch for calls received at the command center 110. Each workstation 210 is operated by a call handler (for example, a dispatcher) that may be tasked with identifying a type of incident based on the one or more received calls from a communication device 105. For example, the call handler may enter a user input into the workstation 210 to identify an incident type and/or a location of the incident (for example, with a text document/incident record) based on a received voice call (for example, an audio feed) where a citizen describes the incident. In some embodiments, the call handler decides how to respond to the call to help the citizen and handle the incident. For example, the workstation 210 may receive a user input from the call handler to transfer the call to a different agency (for example, animal control), take no action (for example, when the call is a prank call or an accidental call), transfer the call to the monitoring computer 205 to be further transferred to the workstation 210 of, for example, an incident-handling dispatcher, and the like. The workstation 210 may transfer information corresponding to the incident type and the location of the incident that was identified by the call handler to the monitoring computer 205. In some embodiments, the workstation 210 also transfers information corresponding to which workstation 210 the call should be transmitted. For example, the workstation 210 receives a user input from the call handler to transfer the call to the workstation 210A because one or more previously-received calls associated with the same incident were routed to the workstation 210A. In this example, the workstation 210A of the same incident-handling call handler receives multiple calls relating to a single incident in which the incident-handling call handler is monitoring and handling.

In some embodiments, the monitoring computer 205 receives calls from communication devices 105 operated by officers such as public safety officers. Generally, public safety officers are trained to identify and handle many different public safety incidents. As a consequence, it may not be necessary for an emergency call-taker to identify a type of incident or how to handle the incident when the data feed is received from a communication device 105 of a public safety officer. Rather, the communication device 105 of a public safety officer may receive a user input from the officer indicating a type of incident (for example, by the officer entering a code that represents the incident type) and other information related to the incident (for example, location, number of victims, and the like). The communication device 105 of the officer then transmits this information as well as any selected data feeds over the network 115 to the monitoring computer 205 to be transferred to a workstation 210 of the incident-handling call handler that is handling the corresponding incident.

While FIGS. 3 and 4 show separate block diagrams of the workstation 210 and the monitoring computer 205, as noted above, in some embodiments, the workstations 210 and/or the emergency call-taking devices are integrated into the monitoring computer 205 and directly controlled by one or more electronic processors of the monitoring computer 205. In other embodiments, the functionality of the monitoring computer 205 may be integrated into each of the workstations 210 and/or the emergency call-taking devices. In some embodiments, the monitoring computer 205, the workstations 210, the emergency call-taking devices, and/or a combination thereof are referred to as an electronic computing device that performs the functionality described below. For example, the electronic computing device may be a single electronic processor (for example, the second electronic processor 405 of the monitoring computer 205) or a plurality of electronic processors located in the monitoring computer 205. In other embodiments, the electronic computing device includes multiple electronic processors distributed across different devices. For example, the electronic computing device is implemented on one or more of the first electronic processors 305 of the workstations 210, the second electronic processor 405 of the monitoring computer 205, and one or more electronic processors located in one or more devices located at the command center 110 (such as emergency call-taking devices), at a remote location, or at a remote cloud-computing cluster. In some embodiments, the electronic computing device is a communication device 105 and an electronic processor of the communication device 105 performs the functionality described below.

As explained above, the workstation 210 located at the command center 110 may receive one or more calls from callers (for example, a voice call, a live or recorded audio/video feed, a text message, and the like). In the illustrated embodiment, the calls are initially received at the monitoring computer 205 and directed to a handling workstation 210. The workstation 210 may additionally or alternatively receive one or more calls from officers handling the incident. For example, the workstation 210 of the incident-handling call handler receives an audio feed or a location tracking feed from a portable communication device 105 of an officer.

In some situations, the workstation 210 is configured to receive multiple data feeds simultaneously. For example, the workstation 210 allows the call handler to engage in a voice call using the microphone 320 and the speaker 325 while presenting multiple biometric data sensor feeds and/or location data sensor feeds on the display 330 to be viewed by the call handler. As another example, the workstation 210 receives multiple voice calls simultaneously and presents options on the display 330 to allow the call handler to select which voice call should be made active for communication between the call handler and a caller. However, in some situations, the workstation 210 may only allow the call handler to participate in a voice call with one other device at a time by order in which they are received.

The situations described above may be problematic during a time of high call volume at the command center 110 when multiple callers are calling in regard to a same existing incident. Call handlers of the command center 110 may not know which callers have additional information in regard to the incident, which callers are in urgent need of assistance, and/or which callers may only be providing redundant information about the incident. Calls that may be critical may be queued due to lack of availability of call handlers and are "stuck" in the queue until a call handler is made available. In addition, when a call is abandoned (for example, the caller hangs up) while the call is still in the queue, the call handler may be required to follow up on the call to ensure no one is in danger and/or that no emergency response is needed. In the meantime, the caller may repeatedly abandon and re-call the command center 110 when attempting to reach a call handler. The above described situations increase both the call volume and call handling time at a command center 110. Thus, there is a technological problem with respect to the communication between a call handler at a public safety command center 110 and people reporting incident information to the call handler.

Figure 5:
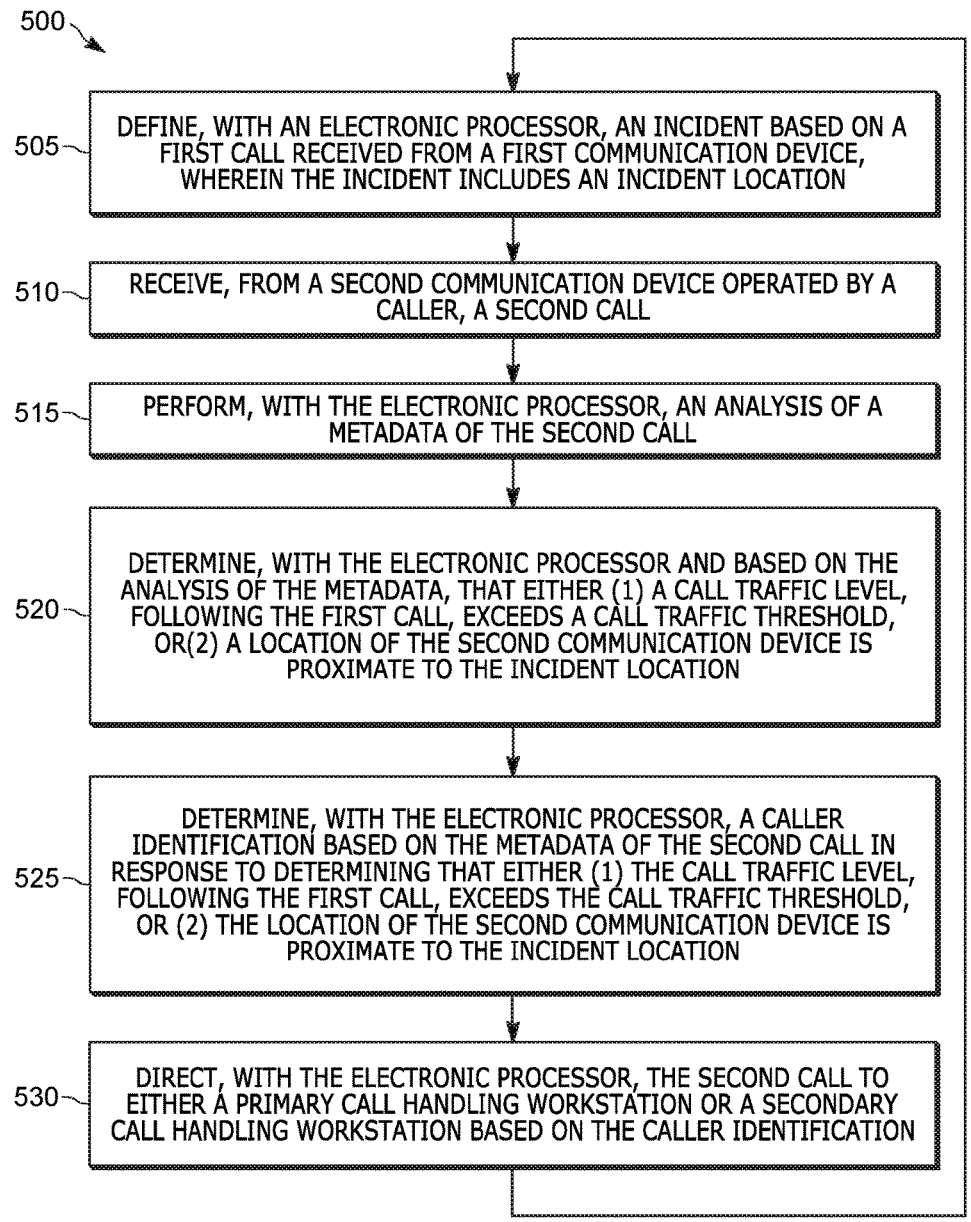
FIG. 5 is a flowchart of a method for call queue improvement of the command center of the communication system of FIG. 1 according to one example embodiment.

To address this technological problem, the electronic computing device described above performs, in one instance, one or more of the methods explained below. For example, a method 500 of FIG. 5 is executed by the electronic computing device to determine when an incoming call may be about an already existing incident and direct the call to either a primary call handling workstation 210A or a secondary call handling workstation 210B based on the identity of the caller. In other embodiments, the electronic computing device is configured to determine a risk level of a caller and direct the call to either call handling workstation 210A or 210B based on the risk level. In some embodiments, the electronic computing device directs the call to an automated call handler based on one or more of the identity of the caller and the risk level. In some embodiments, the secondary call handling work station 210B is an automated workstation. Such methods are performed automatically before the incoming call is received by a call handler and therefore improve call management at a command center 110 during times of high call volume.

The method 500 addresses the above-noted technological problem by improving communication between call handlers of a command center 110 and people reporting incident information to the call handler by allocating calls that may be related to an existing incident based on who the caller is and/or a risk level associated with the caller. As explained in more detail below, the electronic computing device uses information from the metadata of the call from the communication device 105 of the caller received at the monitoring computer 205 to determine whether the call is likely in regard to a known/existing incident. For example, the electronic computing device may use call timestamp data included in the metadata and compare the call timestamp data to information included in one or more existing incident records to determine whether the call may be related to an existing incident. The electronic computing device may also analyze the quantity of call records associated with the incident record within a time after the incident record was first created to determine whether or not to implement the rest of the method 500 (for example, see block 520 of FIG. 5). In other words, the electronic computing device may determine whether the quantity of calls (in other words, a call traffic level) exceeds a predetermined call traffic threshold. In some embodiments, the predetermined call traffic threshold is a quantity of overall calls received by the command center 110 (for example, twenty calls, fifty calls, one hundred calls, and the like). In some embodiments, the predetermined call traffic threshold is a quantity of calls received per period of time by the command center 110 (for example, ten calls per minute). In some embodiments, the predetermined call traffic threshold is an increase in call rate (for example, ten percent increase in call rate over the past minute, twenty-five percent increase in call rate over the past two minutes, and the like). The example threshold values explained above are merely examples and other values may be used in different situations. In some embodiments, a call handler, for example, a primary call handler, may adjust the call traffic threshold to a custom value via the user interface of the workstation 210. As an example of the electronic computing device analyzing quantity of calls to determine whether to implement the rest of the method 500, if more than six calls have been received in regard to a fire at 5432 Street Ave. within the past fifteen minutes, it is likely that no new information will provided in additional calls about the same fire incident.

In some embodiments, an approximate location of the origin of the call (in particular, the communication device 105 that the call is from) may be determined from the metadata included in the call (for example, a location of a cell tower that carried the call). The location may be compared to the incident record to determine if the location of the call is proximate to the incident. In some embodiments, the electronic computing device determines whether the location of the communication device 105 at the time of transmission of the call is within a predetermined threshold distance of the location of the incident (for example, within 100 feet, one half, or one mile, and the like). In some embodiments, the electronic computing device determines whether the location of the communication device 105 at the time of transmission of the call is proximate to the incident location based on the communication device 105 being connected to a same access point or base station or adjacent access point or base station as a previously received call that relates to the incident. In some embodiments, the electronic computing device determines whether the location of the communication device 105 at the time of transmission of the call is proximate to the incident location based on whether the location of the communication device 105 is proximate to or within an area of high call volume (in other words, within a threshold area where most of the calls being received at the command center 110 in a small amount of time are coming from). The area may be a geographic area, a particular building (for example, an office building or apartment complex), and the like. Either or both location and timestamp analysis described above may be performed by the electronic computing device in order to determine if an incoming call is likely in regard to the known/existing incident. For example, a combination of a location of a call and a timestamp of the call may be similar to a time and location of a known incident, suggesting that the call may be related to the known/existing incident.

In some embodiments, the electronic computing device determines a caller identification of calls that are determined to be related to the known incident and, based on the identification, directs the call to either the primary call handling workstation 210A or the secondary call handling workstation 210B. In some embodiments, after determining the identification of the caller, the electronic computing device determines a risk level of the caller based on additional information from one or more sensors (included within and/or separate from the communication device 105, for example, those described above). The electronic computing device directs the call to either the primary call handling workstation 210A or the secondary call handling workstation 210B based on the risk level. For example, when the risk level exceeds a first predetermined risk threshold, the call is directed to the primary call handling workstation 210A and, when the risk level fails to exceed the first predetermined risk threshold, the call is directed to the secondary call handling workstation 210B. In some embodiments, the electronic computing device directs the call to an automated call handler when the risk level fails to exceed a second predetermined risk threshold. In other words, with some exceptions based on the identification of a caller, calls associated with a high risk level are directed to the primary call handling workstation 210A and calls associated with a lower and/or moderate risk level are directed to the secondary call handling workstation 210B. In other embodiments, calls associated with a low risk level, rather than being directed to the secondary call handling workstation 210B, are directed to an automated call handler. In some embodiments, a call that is initially directed to the automated call handler is later directed to the primary call handling workstation 210A or the secondary call handling workstation 210B. For example, the electronic computing device determines that the call is likely to provide information about an incident that is already known or that the call is associated with a low risk level. However, after receiving responses to an automated questionnaire provided by the automated call handler, the electronic computing device determines that the caller is providing new information about the incident or another incident or that the risk level of the call has increased (for example, the caller is now in danger). In response to making such a determination based on the responses received by the automated call handler, the electronic computing device redirects the call to the primary call handling workstation 210A or the secondary call handling workstation 210B.

The above-noted solution allows, among other things, calls to be allocated to an appropriate call handler. In addition, the solution filters out calls that likely provide redundant information and non-critical calls that do not need to be handled by the primary call handler(s). Thus, the method 500 improves the speed and efficiency at which a command center 110 may handle calls during a time of high call volume.

FIG. 5 illustrates a flow chart of the method 500 for managing calls at the command center 110 and performed by the electronic computing device described above according to one example. While a particular order of processing steps is indicated in FIG. 5 as an example, the timing and ordering of the steps may vary where appropriate without negating the purpose and advantages of the method 500. In addition, the method 500 is described as being performed by the electronic computing device, in particular, the electronic processor 405. However, it should be understood that in some embodiments, portions of the method 500 are performed external to the monitoring computer 205 by other devices, including for example, one or more of the workstations 210 and the devices 105.

At block 505, the electronic computing device defines an incident based on a first call received from a first communication device 105 (for example, from a civilian calling about an incident). An incident record is created in response to a received call regarding an incident. As explained above, the incident record includes details regarding the incident (for example, an incident location). The call includes one or more data feeds transmitted over a first communication channel from the first communication device 105. As noted, the data feed may include one or more of an audio feed, a video feed, and a text feed.

At block 510, the electronic computing device receives, from a second communication device 105 operated by a caller, a second call. At block 515, the electronic computing device performs an analysis of a metadata of the second call. The analysis includes, as described above, comparing either or both of a timestamp of the call and a location of the call to the time and location of the existing incident stored in the incident record.

In some embodiments, to determine whether to execute the remaining blocks of the method 500, the electronic computing device determines one or both of the call traffic level (in other words, the quantity of calls being received by the command center 110) and the location of the second communication device 105 at the time of transmission of the call as explained above. In some embodiments, the electronic computing device compares one or both of this determined information to a respective threshold as explained above (for example, a call traffic threshold and a threshold distance, respectively). In other words, the electronic computing device determines whether the command center 110 is receiving too many calls for call handlers to handle (for example, receiving more calls than there are call handlers) and/or whether a received second call is likely to be related to a known/existing incident based on location information. At block 520, the electronic computing device determines, based on the analysis of the metadata (at block 515), that either (1) a call traffic level, following the first call, exceeds a call traffic threshold, or (2) a location of the second communication device 105 is proximate to a location of the incident. In other words, the electronic computing device determines either that the command center 110 is receiving a significant quantity of calls or that the second call was received from a location near the location of a known/existing incident.

At block 525, as described above, the electronic computing device determines a caller identification based on the metadata of the second call in response to the electronic computing device determining that either the call traffic level, following the first call, exceeds the call traffic threshold or the location of the second communication device 105 is proximate to the location of the known/existing incident. In other words, when the call traffic level is high or the second call is determined to possibly be related to the known incident based on proximate location information, the electronic computing device determines the identity of the caller.

The identity of the caller may include one or more of a name (for example, "John Brown") or a role of the caller. The role associated with the caller may be determined, for example, by retrieving contact information from a public safety contact database of the command center 110 when the communication device 105 from which the call is received is associated with a known public safety officer. The identity of the caller may be included in the metadata of the call (for example, a caller ID) and compared to contact information in one or more databases accessible to the command center 110, including those outside the communication system 100. The identity may also be determined by identifying a name and/or employee identification number associated with the communication device 105 from which the call is received by referring to one or more databases within and/or outside the communication system 100. The electronic computing device may be configured to determine based on the caller identification, when the caller is a public safety personnel, if the public safety personnel is currently assigned to (handling) the known incident by referring to a handling personnel list within the corresponding incident record. In some embodiments, the electronic computing device may look up the telephone number associated with the communication device 105 from which the call is received in one or more public databases to determine the caller identification. In such embodiments, the electronic computing device may determine when the call is a spam or telemarketing number. Similarly, the command center 110 may store, in one or more databases in communication with the electronic computing device, contact information of blacklisted callers (for example, civilians who repetitiously prank call the command center 110).

In some embodiments, before or after determining the caller identification at block 525, the electronic computing device provides an automated message to the communication device 105 that prompts the caller to confirm whether the purpose of the call is in regard to the known incident. The communication device 105 may output the received automated message via a user output of the communication device 105 (for example, via a speaker and/or display) and receive input and answers from the caller via a user input of the communication device 105. Additional information regarding the purpose of the call may be retrieved, for example, via natural language processing, optical character recognition, or both. For example, the electronic computing device uses a natural language processing engine to recognize keywords spoken by a caller during a call (for example, "gas leak," "fire," and the like) to determine that the call relates to a particular type of public safety incident. Based on the information, the electronic computing device may output additional questions and/or determine where to direct the call. These automated messages and automatic input processing may be performed via an automated call handler process (referred to herein as an automated call handler) performed by the electronic computing device. As noted above, in some embodiments, a secondary call handling workstation 210 is an automated call handler.

At block 530, the electronic computing device directs the second call to either the primary call handling workstation 210A or the secondary call handling workstation 210B based on the caller identification. For example, when the caller identification indicates that the caller is a public safety officer handling the incident, the call is directed to the primary call handling workstation 210A. When the caller identification indicates that the caller is a non-public safety officer and/or a public safety officer not currently assigned to the incident, the call is directed to the secondary call handler. Calls that are identified as being from a blacklisted caller and/or telemarketing center may also be directed to the secondary call handling workstation 210B, which in some embodiments is an automated call handler. As indicated in FIG. 5, in some embodiments, after the electronic computing device executes block 530, the method 500 proceeds back to block 505 to continue receiving and analyzing calls. Accordingly, the electronic computing device performs the method 500 with respect to additional received calls. Additionally, the electronic computing device may redirect received calls as information associated with the calls changes. For example, the electronic computing device initially directs a seemingly low risk call to an automated call handler but then redirects the call to a manually-operated call handling workstation 210 in response to a risk level of the call increasing as described above.

In some embodiments, the electronic computing device is configured to determine, in response to either the call traffic level exceeding the call traffic threshold or a location of the second communication device 105 being proximate to a location of the incident, a call factor of the call (for example, via one or more data feeds from the sensor of the communication device 105 described above). The call factor is used by the electronic computing device to determine a risk level of the caller. As previously described, the electronic computing device uses the risk level to determine whether to direct the call to the primary call handling workstation 210A or the secondary call handling workstation 210B or, in other embodiments, the automated call handler. The call factor may include an incident identity, a relative location of the communication device 105 with respect to a scene of the incident, a direction of travel of the communication device 105, a speed of travel of the communication device 105, or combination of the foregoing. In some embodiments, the electronic computing device may prompt the user, via an automatic message output by the communication device 105, to confirm the one or more call factors (for example, the message may be "If you are calling in regard to a fire, please press "1" or "Are you near the scene of the incident?").

As noted, one of the call factors may include an incident identity. In one example, the incident identity is the type of incident (for example, a fire, robbery, home invasion, etc.). The incident identity may be determined by additional text data from the communication device 105. For example, when the communication device 105 is a portable communication device of a public safety officer, the public safety officer may enter a user input into the communication device 105 indicating a type of incident (for example, a code that represents the incident type) and other information related to the incident. The electronic computing device may determine the incident type based on information in the incident record of the known incident, (for example, when the caller has confirmed in response to the automatic message that the call is in regard to the known incident). Different incident types may correspond to different risk levels. For example, an armed robbery may be associated with a higher risk than an unarmed robbery. The risk level of a particular incident type may also be dependent on the amount of time after the call was first reported (for example, the risk level may be higher when the incident is active).

As also noted, one of the call factors may include a relative location of the communication device 105. In some instances, the relative location of the communication device 105 is a relative location of the communication device 105 with respect to a scene of the incident. For example, when the incident occurs in a building, the relative location of the device 105 may be within the building, on a particular level of the building, or outside the building. The closer the caller is to the scene, the greater the risk level may be. The relative location of the communication device 105 may be determined, for example, by analyzing a video feed from a camera of the device 105 and/or a video feed received at the electronic computing device from a surveillance camera proximate to the scene. In some embodiments, the relative location of the device 105 may be determined based on the IP address of the device (when the device 105 is connected to a public network broadcast at a public facility). The closer the caller is to the scene, the greater the risk level may be.

Other example call factors are the direction of travel of the communication device 105 and the speed of travel of the communication device 105. The direction of travel and speed of travel of the communication device may be determined based on data feeds from the one or more sensors of the communication device 105 (for example, an accelerometer and/or GPS). When a caller is moving quickly away from the incident and/or if the caller is moving in a direction opposite the location of the incident, the risk level is less than if the caller is moving quickly towards the incident.

In some embodiments, the call factor may also include one or more biometric measurements from the biometric sensors described above. For example, the risk level may be higher when the biometric sensor indicates that an officer has removed their weapon from its holster.

As described above, in some embodiments, the electronic computing device is configured to compare the risk level to a second predetermined risk threshold. When the risk level exceeds the second predetermined risk threshold, the electronic computing device directs the second call to the secondary call handling workstation 210B. Otherwise, the call may be sent to an automated call handler that may be embodied by the secondary call handling workstation 210 or, in some embodiments, a tertiary call handling workstation 210C. As explained above, in some embodiments, when the risk level exceeds a first predetermined risk threshold that is higher than the second predetermined threshold, the electronic computing device directs the second call to the primary call handling workstation 210A. With respect to calculation of the risk level, in some embodiments, the electronic computing device generates point values depending on one or more of the call factors described above on a scale of, for example, one to ten for each call factor. For example, the electronic computing device calculates a point value of ten based on the location of the caller when the caller is located near the incident and gradually decreases the point value as the caller moves away from the incident. As another example, the electronic computing device calculates a point value of ten when the incident involves an active shooter and may calculate a lower point value (for example, two) when the incident is a vehicle accident that has already occurred. As yet another example, the electronic computing device adds ten points to an overall risk level score when a public safety officer removes a gun from its holster. In some embodiments, the electronic computing device adds up the individual point values of multiple call factors to determine the overall risk level score. Then the electronic computing device compares the overall risk level score to one or more predetermined risk thresholds as described above to determine whether to direct a received call to a primary call handling workstation 210A or a secondary call handling workstation 210B that may include an automated call handler.

As described above, the automated call handler provides questions (via an automated questionnaire) to a caller to determine, for example, the identity of the caller and the purpose of their call. The automated call handler may determine, based on the caller's answer(s), whether to redirect the call to a workstation 210 (for example, the secondary call handling workstation 210B or the workstation 210 of another command center 110), a call back call queue, and so on. In some embodiments, the automated call handler may be configured to automatically add details to the corresponding call record based on the answers provided by the caller. In other words, the electronic computing device is configured to determine and record information about the call and the incident the caller is calling in regard to based on one or more data feeds received from the communication device 105 in response to the one or more questions provided in the automated questionnaire. In some embodiments, the automated call handler may be configured to redirect the call to either the secondary call handler or primary call handler based on the information received during the call. For example, the electronic computing device may update the risk level of the call based on new or updated call factors determined based on the received information. The electronic computing device may redirect the call to a workstation 210 being operated by a call handler (for example, the primary workstation 210A or secondary workstation 210B) when the risk level exceeds risk threshold. In some embodiments, the automated call handler may be configured to direct the call to a workstation 210 being operated by a call handler when the caller indicates that they want to speak to a call handler.

As mentioned above, although most of the above-described examples refer to an audio data feed (voice call) of a communication device 105, in some embodiments, the electronic computing device receives and analyzes additional data feeds with the call in accordance with the methods described above. In some embodiments, the data feeds include one or more of a video feed, audio/video feed, a text feed, an image feed, and a sensor input data feed.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for managing calls at a command center, the system comprising:
an electronic computing device including an electronic processor configured to
define an incident based on a first call received from a first communication device, wherein the incident includes an incident location;
receive, from a second communication device operated by a caller, a second call;
perform an analysis of a metadata of the second call;
determine a caller identification based on the metadata of the second call when the electronic processor determines, based on the analysis, that either (1) a call traffic level, following the first call, exceeds a call traffic threshold, or (2) a location of the second communication device is proximate to the incident location;
determine, in response to either (1) or (2), a call factor, the call factor including either or both a direction of travel of the second communication device and a speed of travel of the second communication device, and
direct the second call to either a primary call handling workstation or a secondary call handling workstation based on the caller identification and call factor.

2. The system of claim 1, wherein the electronic processor is further configured to
determine, based on the call factor, a risk level of the caller.

3. The system of claim 2, wherein the electronic processor is further configured to determine, based on the risk level, whether to direct the second call to the primary call handling workstation or the secondary call handling workstation.

4. The system of claim 1, wherein the call factor further includes at least one selected from the group of an incident identity, the location of the second communication device with respect to a scene of the incident, and a role of the caller.

5. The system of claim 2, wherein the electronic processor is further configured to
compare the risk level of the second call to a risk threshold; and
direct the second call to the second call handling workstation in response to determining that the risk level fails to exceed the risk threshold, wherein the second call handling workstation is an automated call handler.

6. The system of claim 1, wherein the metadata includes at least one selected from the group consisting of a call timestamp and the location of the second communication device.

7. The system of claim 1, wherein the secondary call handling workstation is an automated call handler.

8. A method for managing calls at a command center, the method comprising:
defining, with an electronic processor, an incident based on a first call received from a first communication device, wherein the incident includes an incident location;
receiving, from a second communication device operated by a caller, a second call;
performing, with the electronic processor, an analysis of a metadata of the second call;
determining, with the electronic processor and based on the analysis of the metadata, that either (1) a call traffic level, following the first call, exceeds a call traffic threshold, or (2) a location of the second communication device is proximate to the incident location;
determining, with the electronic processor, a caller identification based on the metadata of the second call in response to determining that either (1) the call traffic level, following the first call, exceeds the call traffic threshold, or (2) the location of the second communication device is proximate to the incident location;
determining, in response to either (1) or (2), a call factor, the call factor including either or both a direction of travel of the second communication device and a speed of travel of the second communication device, and
directing, with the electronic processor, the second call to either a primary call handling workstation or a secondary call handling workstation based on the caller identification and the call factor.

9. The method of claim 8 further comprising
determining, with the electronic processor and based on the call factor, a risk level of the caller.

10. The method of claim 9 further comprising:
determining, with the electronic processor and based on the risk level, whether to direct the second call to the primary call handling workstation or the secondary call handling workstation.

11. The method of claim 8, wherein the call factor further includes at least one selected from the group of an incident identity, the location of the second communication device with respect to a scene of the incident, and a role of the caller.

12. The method of claim 9 further comprising:
   comparing, with the electronic processor, the risk level of the second call to a risk threshold; and
   directing, with the electronic processor, the second call to the secondary call handling workstation in response to determining that the risk level fails to exceed the risk threshold, wherein the secondary call handling workstation is an automated call handler.

13. The method of claim 8, wherein the metadata includes at least one selected from the group consisting of a call timestamp and the location of the second communication device.

14. The method of claim 8, wherein the secondary call handling workstation is an automated call handler.

15. The system of claim 2, wherein the electronic processor is further configured to, when the second call is directed to the secondary call handling workstation, determine, during the second call, that the risk level is greater than previously determined and direct the second call to the primary call handling workstation.

16. The system of claim 1, wherein the electronic processor is further configured to, when the second call is directed to the secondary call handling workstation, determine, during the second call, that the caller has new information regarding the incident or another incident and direct the second call to the primary call handling workstation.

17. The system of claim 1, wherein the call factor is updated based on received information received during the second call.

18. The method of claim 9, the method further comprising when the second call is directed to the secondary call handling workstation, determining, during the second call, that the risk level is greater than previously determined and direct the second call to the primary call handling workstation.

19. The method of claim 8, the method further comprising when the second call is directed to the secondary call handling workstation, determine, during the second call, that the caller has new information regarding the incident or another incident and direct the second call to the primary call handling workstation.

20. The method of claim 8, wherein the call factor is updated based on received information received during the second call.

* * * * *